United States Patent
Jung et al.

(10) Patent No.: US 10,404,441 B2
(45) Date of Patent: Sep. 3, 2019

(54) METHOD AND APPARATUS FOR CONFIGURING TRANSMISSION TIME INTERVAL IN MOBILE COMMUNICATION SYSTEM

(71) Applicant: ELECTRONICS AND TELECOMMUNICATIONS RESEARCH INSTITUTE, Daejeon (KR)

(72) Inventors: Soojung Jung, Daejeon (KR); Anseok Lee, Daejeon (KR); Seungkwon Cho, Daejeon (KR); Sung Cheol Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 208 days.

(21) Appl. No.: 14/938,822

(22) Filed: Nov. 11, 2015

(65) Prior Publication Data

US 2016/0135182 A1 May 12, 2016

(30) Foreign Application Priority Data

Nov. 11, 2014 (KR) .................. 10-2014-0156379
Nov. 11, 2015 (KR) .................. 10-2015-0157929

(51) Int. Cl.
*H04L 5/00* (2006.01)

(52) U.S. Cl.
CPC .......... *H04L 5/0064* (2013.01); *H04L 5/0007* (2013.01); *H04L 5/0044* (2013.01)

(58) Field of Classification Search
CPC .................................................. H04W 72/00
See application file for complete search history.

(56) References Cited

U.S. PATENT DOCUMENTS

| | | |
|---|---|---|
| 2006/0262871 A1 | 11/2006 | Cho et al. |
| 2009/0175372 A1 | 7/2009 | Moon et al. |
| 2009/0245412 A1 | 10/2009 | Cho et al. |
| 2010/0172337 A1 | 7/2010 | Cho et al. |
| 2010/0260164 A1 | 10/2010 | Moon et al. |
| 2011/0170533 A1 | 7/2011 | Cho et al. |
| 2011/0261769 A1* | 10/2011 | Ji .................. H04L 5/0007 370/329 |
| 2012/0230216 A1 | 9/2012 | Park et al. |
| 2012/0294248 A1 | 11/2012 | Seo et al. |
| 2013/0070698 A1 | 3/2013 | Kim et al. |

(Continued)

FOREIGN PATENT DOCUMENTS

| | | |
|---|---|---|
| JP | 2006-314110 A | 11/2006 |
| KR | 10-2009-0067011 A | 6/2009 |

(Continued)

*Primary Examiner* — Sulaiman Nooristany
(74) *Attorney, Agent, or Firm* — Rabin & Berdo, P.C.

(57) ABSTRACT

Disclosed herein is a base station of a mobile communication system configuring at least one low latency transmission time interval (TTI) within a length of at least one transmission symbol in a subframe including a plurality of transmission symbols and transmitting LL (low latency) TTI related information using a physical control format indicator channel (PCFICH) transmitted at a pre-defined transmission symbol position within the subframe.

8 Claims, 13 Drawing Sheets

(56) References Cited

U.S. PATENT DOCUMENTS

| | | | |
|---|---|---|---|
| 2013/0215842 A1* | 8/2013 | Han | H04W 72/042 |
| | | | 370/329 |
| 2014/0301359 A1 | 10/2014 | Seo et al. | |
| 2016/0330003 A1* | 11/2016 | Chung | H04L 5/0048 |

FOREIGN PATENT DOCUMENTS

| | | |
|---|---|---|
| KR | 10-2010-0006118 | 1/2010 |
| WO | WO-2011/074868 A2 | 6/2011 |
| WO | WO-2013/055078 A2 | 4/2013 |

* cited by examiner

METHOD AND APPARATUS FOR CONFIGURING TRANSMISSION TIME INTERVAL IN MOBILE COMMUNICATION SYSTEM

CROSS-REFERENCE TO RELATED APPLICATION

This application claims priority to and the benefit of Korean Patent Application Nos. 10-2014-0156379 and 10-2015-0157929, filed in the Korean Intellectual Property Office on Nov. 11, 2015 and Nov. 11, 2015, respectively, the entire contents of which are incorporated herein by reference.

BACKGROUND OF THE INVENTION (a) Field of the Invention

The present invention relates to a method and an apparatus for configuring a transmission time interval in a mobile communication system, and more particularly, to a method and an apparatus for configuring a transmission time interval capable of supporting services having requirements for lower latency of less than 1 ms between a base station and a terminal in a mobile communication system.

(b) Description of the Related Art

A communication system such as an LTE (long term evolution) or LTE-advanced can employ a transmission time interval (TTI) for transmission of data between user terminal and a base station. Within each TTI, data packets are delivered to the L1 layer from the L2 layer and transmitted over the radio interface to the L1 layer of a receiver.

Upon reception of a data packet, the receiver makes an attempt to decode the data packet and informs the transmitter about the outcome of the decoding operation through a single acknowledgement bit indicating whether the decoding was successful or if a retransmission of the data packet is required. If the decoding fails, the receiver notifies the transmitter by sending a negative acknowledgement (NACK). In response to an NACK, the transmitter retransmits the same data packet. Such the HARQ operation is performed in a TTI unit of length 1 ms. A latency across the radio access link is determined based on times required for data transmission, reception and HARQ procedure.

In the LTE, the TTI corresponds to one subframe of length 1 ms. Accordingly, in the case of LTE, the TTI corresponding to one subframe of length 1 ms may not support services having requirements for lower latency of less than 1 ms.

SUMMARY OF THE INVENTION

The present invention has been made in an effort to provide a method and an apparatus for configuring a transmission time interval in a mobile communication system having advantages of supporting services having requirements for lower latency of less than 1 ms.

An exemplary embodiment of the present invention provides a method for configuring a TTI in a base station of a mobile communication system. The method for configuring a TTI includes: configuring at least one LL (low latency) TTI corresponding to a length of at least one transmission symbol in a subframe including a plurality of transmission symbols; and transmitting LL TTI related information using a physical control format indicator channel (PCFICH) transmitted at a defined transmission symbol position within the subframe.

The configuring at least one LL TTI may include configuring a control region and a data region within the LL TTI which are changed in units of LL TTIThe configuring at least one LL TTI.

The configuring at least one LL TTI may further include that the control region and the data region in each LL TTI are divided in a frequency domain or a time domain.

The PCFICH may carry control format indicator (CFI) information of 2 bits and a TTI indicator representing the LL TTI may be transmitted using the CFI information.

The transmitting may further include transmitting information related to the number of transmission symbols within the LL TTI and configuration of the control region and the data region within the LL TTI.

The PCFICH may carry CFI information of N bits larger than 2 and the transmitting may include transmitting the information related to the number of transmission symbols within the LL TTI using some of the N bits; and transmitting the information related to configuration of a control region and a data region within the LL TTI using at least some remaining unused bits of the N bits.

The CFI information may further include information related to duration in which the CFI information is applied.

The configuration information of the control region and the data region may further include an indicator of 1 bit representing a division scheme of the control region and the data region and the division scheme may include a division in a frequency domain and a division in a time domain.

The transmitting may include: indicating whether there is an enhanced PCFICH (ePCFICH) using the PCFICH and transmitting information related to the number of transmission symbols configuring the LL TTI and information related to configuration of a control region and a data region within the LL TTI using the ePCFICH.

The information related to the configuration of the control region and the data region may include bandwidth information occupied by the control region to the entire bandwidth or the number of transmission symbols for the control region among the number of total transmission symbols within the LL TTI depending on the number of transmission symbols within the LL TTI.

Another embodiment of the present invention provides an apparatus for configuring a TTI in a mobile communication system. The apparatus for configuring a TTI includes a processor and a transceiver. The processor configures at least one LL TTI with a length of at least one transmission symbol in a subframe including a plurality of transmission symbols and indicates information about at least one LL TTI using CFI information. The transceiver transmits a PCFICH carrying the CFI information at a predefined transmission symbol position within the subframe.

The CFI information may consist of 2 bits and one of values represented by 2 bits may be used as a TTI indicator indication the LL TTI.

The processor may transmit information related to the number of transmission symbols configuring the LL TTI and information related to configuration of a control region and a data region within the LL TTI through the transceiver.

The CFI information may consist of N bits larger than 2 and the processor may some of the N bits to indicate the information related to the number of transmission symbols within the LL TTI and use some of the remaining unused bits of the N bits to indicate the information related to configuration of a control region and a data region within the LL TTI.

The processor may use other unused bits of N bits to indicate duration in which the CFI information is applied.

The processor may use other unused bits of N bits to represent a division of the control region and the data region and the division scheme may include a division in a frequency domain and a division in a time domain.

The processor may use the PCFICH to indicate whether there is an ePCFICH (enhanced PCFICH) and generate eCFI (enhanced CFI) information including the number of transmission symbols within the LL TTI and configuration information of a control region and a data region within the LL TTI and the transceiver may transmit the ePCFICH carrying the eCFI information.

The information related to configuration of the control region and the data region may include bandwidth information occupied by the control region to the entire bandwidth or the number of transmission symbols for the control region among the number of total transmission symbols within the LL TTI depending on the number of transmission symbols within the LL TTI.

The processor may change the configuration of a control region and a data region within the LL TTI in at least one LL TTI units.

The processor may identically configure a control region and a control region within the LL TTI during at least one LL TTI and the number of LL TTIs within the subframe and the configurations of the control region and the data region within the LL TTI may be changed in units of subframe.

DETAILED DESCRIPTION OF THE EMBODIMENTS

Figure 1:
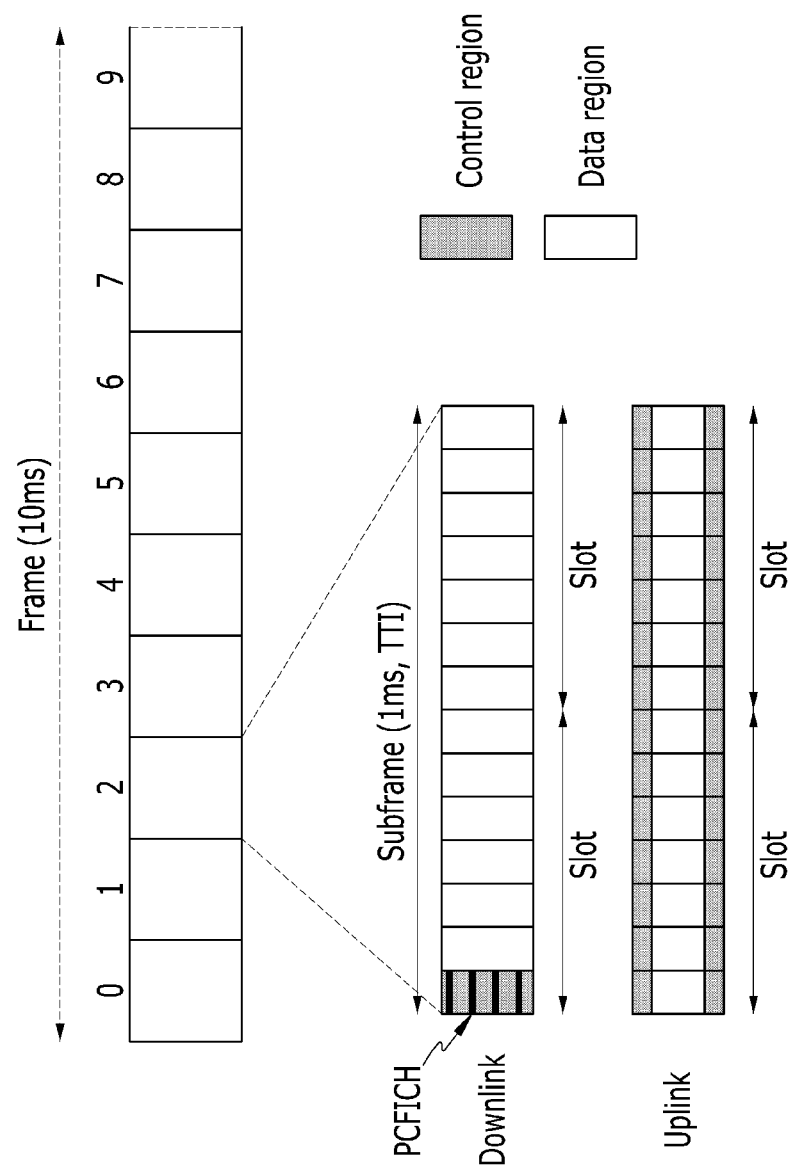
FIG. 1 is a diagram illustrating a TTI in a mobile communication system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification and claims, unless explicitly described to the contrary, "comprising" any components will be understood to imply the inclusion of other elements rather than the exclusion of any other elements.

Throughout the specification, a terminal may be called a mobile terminal (MT), a mobile station (MS), an advanced mobile station (AMS), a high reliability mobile station (HR-MS), a subscriber station (SS), a portable subscriber station (PSS), an access terminal (AT), a user equipment (UE), and the like and may also include all or some of the functions of the MT, the MS, the AMS, the HR-MS, the SS, the PSS, the AT, the UE, and the like.

Further, a base station (BS) may be called an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as the base station, a relay node (RN) serving as the base station, an advanced relay station (ARS) serving as the base station, a high reliability relay station (HR-RS) serving as the base station, small base stations [a femto base station (femoto BS), a home node B (HNB), a home eNodeB (HeNB), a pico base station (pico BS), a metro base station (metro BS), a micro base station (micro BS), and the like], and the like and may also include all or some of the functions of the ABS, the HR-BS, the nodeB, the eNodeB, the AP, the RAS, the BTS, the MMR-BS, the RS, the RN, the ARS, the HR-RS, the small base stations, and the like.

Hereinafter, a method and an apparatus for configuring a TTI in a mobile communication system according to an exemplary embodiment of the present invention will be described in detail with reference to the accompanying drawings.

FIG. 1 is a diagram illustrating a TTI in a mobile communication system.

Referring to FIG. 1, in a long term evolution (LTE) system which is a representative mobile communication system, one frame includes a plurality of subframes 0-9 in a time domain. Each subframe 0-9 is 1 msec long and consists of two time slots.

A transmission time interval (TTI) is defined as a minimum length of time at which transport blocks (data) of dynamic size are delivered to the physical layer and transmitted over the radio interface. In the LTE system, the TTI corresponds to one subframe of length 1 ms.

In the case of a frequency division duplex (FDD) frame in which a downlink and an uplink are divided into a frequency domain, a downlink subframe and an uplink subframe each consist of two time slots, in which each time slot has a length of 0.5 ms. The time slot includes a plurality of transmission symbols in a time domain and a plurality of resource blocks in the frequency domain. The resource block includes a plurality of subcarriers in the frequency domain. The transmission symbol may be called an orthogonal frequency division multiplex (OFDM) symbol, an orthogonal frequency division multiple access (OFDMA) OFDMA symbol, a single carrier-frequency division multiple access (SC-FDMA) symbol, etc., depending on a multiple access scheme. The number of transmission symbols included in one time slot may be variously changed depending on a channel bandwidth or a length of a CP. For example, in the case of a normal CP, one time slot includes 7 transmission symbols but in the case of an extended CP, one time slot includes 6 transmission symbols. For better comprehension and ease of description, FIG. 1 illustrates a subframe in which one time slot consists of 7 transmission symbols.

The downlink subframe is divided into a control region followed by a data region in the time domain. The control region may occupy a maximum of three transmission symbols within a first time slot of each subframe but the number of transmission symbols occupied by the control region may be changed. The control region may consist of different physical channel types: a physical downlink control channel (PDCCH), a physical control format indicator channel (PCFICH), a physical hybrid automatic retransmit request indicator channel (PHICH), etc. In particular, the PCFICH is always mapped to the first OFDM symbol of each subframe and indicates the size of the control region in terms of transmission symbols in the TTI. The data region includes a physical downlink shared channel (PDSCH) that carries the downlink data.

The uplink subframe may be divided into the control region and the data region in the frequency domain. The control region is allocated with a physical uplink control channel (PUCCH) that carries the uplink control information (UCI). The data region is allocated with a physical uplink shared channel (PUSCH) that carries the uplink data.

Figure 2:
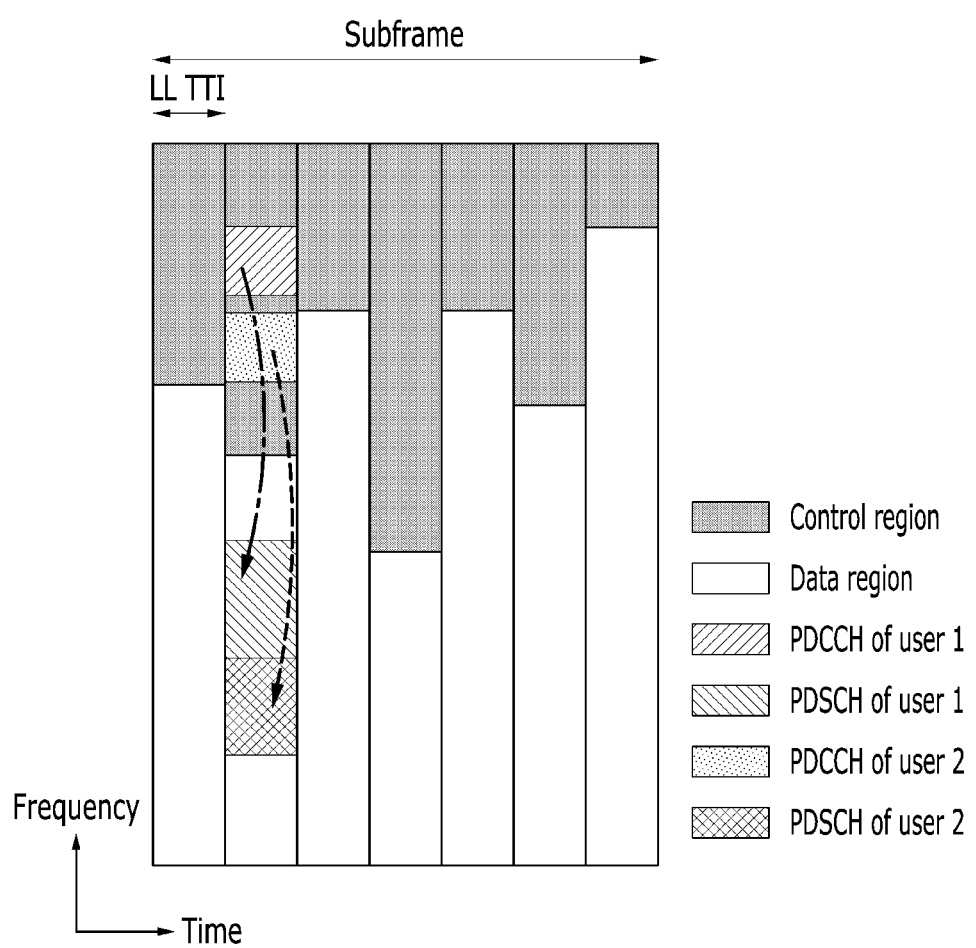
FIG. 2 is a diagram illustrating an example of an LL TTI according to an exemplary embodiment of the present invention.

FIG. 2 is a diagram illustrating an example of an LL TTI according to an exemplary embodiment of the present invention.

Referring to FIG. 2, a base station defines a new TTI (hereinafter, referred to as a "LL (low latency) TTI") shorter than the TTI of 1 ms for supporting the low latency service and performs transmission of control signals and data in a LL TTI unit. The LL TTI may consist of at least one transmission symbol. That is, the minimum time length of the TTI may be same as length of one transmission symbol. The length of LL TTI may be varied in units of the transmission symbol. In the LL TTI, the control region and the data region may be divided into the frequency domain. The control region may include, PDCCHs of different terminals, for example, user 1 and user 2 and the data region may include, for example, PDSCHs of the user 1 and the user 2. As such, when the length of LL TTI corresponds to a length of one transmission symbol, there are a plurality of LL TTIs within one subframe. The configuration of control region and the data region for each LL TTI within a subframe may be varied. Further, position of the control channel within the control region of the LL TTI may be specified by a specific frequency region of the overall system bandwidth. Further, the control channel within the control region of the LL TTI may also be mapped on distributed frequencies of the overall system bandwidth according to the pre-defined information.

For example, as illustrated in FIG. 2, a start position of the control region may be fixed to an edge of the bandwidth. In this case, the terminal may know a starting point of the data region depending on the proportion of the control region and the data region. Differently from FIG. 2, the plurality of LL TTIs within a subframe may have the same configurations of the control region and the data region and the proportion of the control region and the data region may be varied per subframe.

As such, the plurality of LL TTIs may be configured within one subframe, and therefore, even though the terminals are located in the same cell, the base station may allocate different LL TTIs to each terminal according to its transmission delay requirements or its position in a cell.

Figure 3:
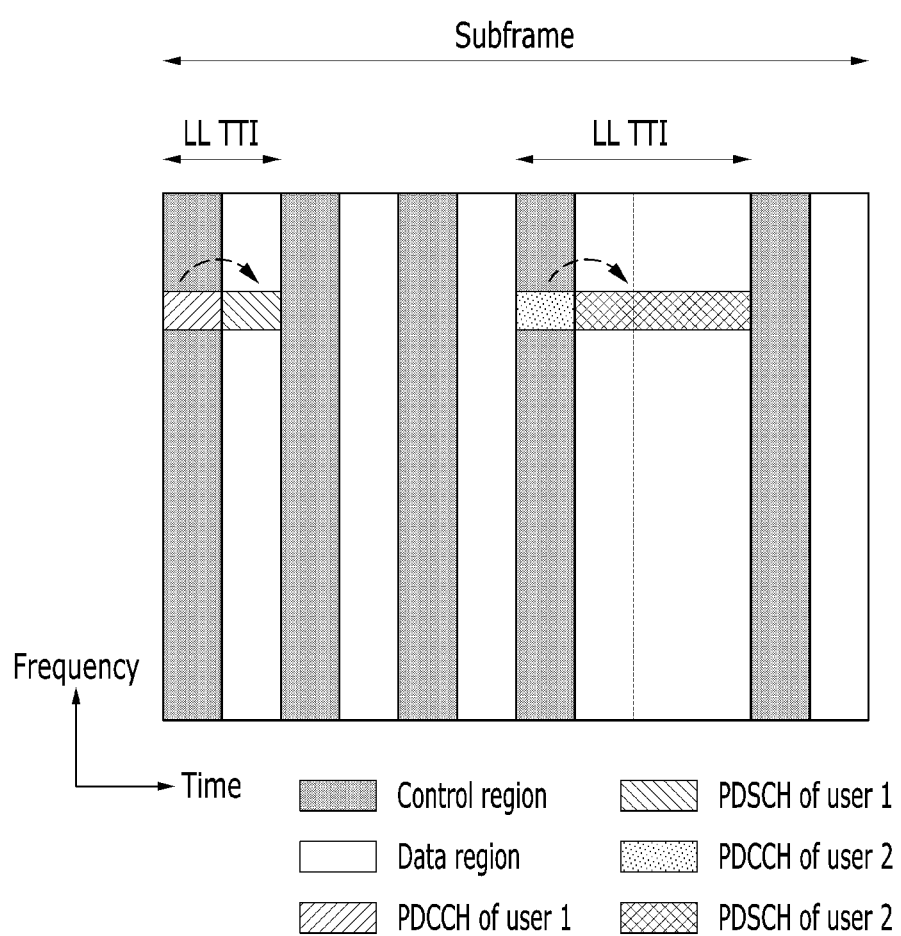
FIG. 3 is a diagram illustrating another example of the LL TTI according to the exemplary embodiment of the present invention.

FIG. 3 is a diagram illustrating another example of the LL TTI according to the exemplary embodiment of the present invention.

Referring to FIG. 3, the LL TTI may consist of a length of at least one transmission symbol and the control region and the data region within the LL TTI may be divided into a time domain. Further, the control region and the data region may be differently configured for each of the plurality of LL TTIs within the subframe.

For example, as illustrated in FIG. 3, the number of transmission symbols occupied by the control regions in the plurality of LL TTIs within the subframe may be fixed and the number of transmission symbols occupied by the data region may be configured to be different from each other. On the other hand, not only the number of transmission symbols occupied by the data regions but also the number of transmission symbols occupied by the control regions in the plurality of LL TTIs within the subframe may be configured to be different from each other.

Further, the plurality of LL TTIs within one subframe may have the same configurations of the control region and the data region in each LL TTI and the proportion of the control region and the data region in each LL TTI may be varied per subframe.

Further, the number of LL TTIs, which may be configured within one subframe, may be a fixed value. For example, the LL TTIs in one subframe may be configured of only 1 symbol, 2 symbols, or 3 symbols. When a frame is made up of only the LL TTIs corresponding to fixed multiple symbols, information related to the lengths of the LL TTIs and position of each LL TTI within the frame or the subframe, etc., may be provided through separate system information or a separate control channel.

Figure 4:
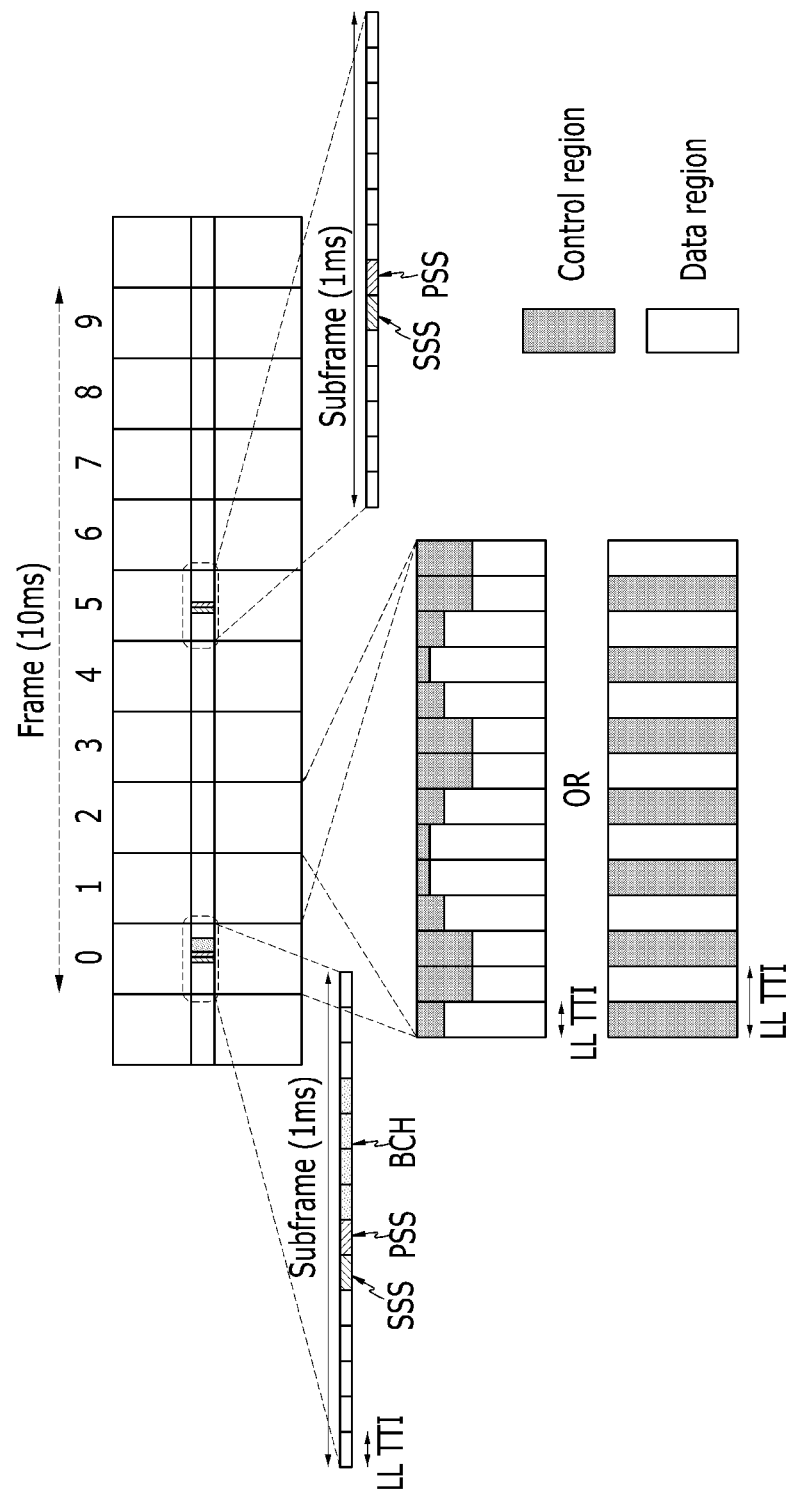
FIG. 4 is a diagram illustrating an example in which the LL TTI according to the exemplary embodiment of the present invention is applied to a downlink frame structure of the existing LTE system.

FIG. 4 is a diagram illustrating an example in which the LL TTI according to the exemplary embodiment of the present invention is applied to a downlink frame structure of the existing LTE system.

As illustrated in FIG. 4, the LL TTI may be applied to the subframe of the downlink frame without the structural change of the downlink frame of existing LTE system. Therefore, the structure of synchronization signal [for example, primary synchronization signal (PSS), a secondary synchronization signal (SSS)], a broadcast channel (BCH) of the existing LTE system, may be reused without changes in the frame to which the LL TTI is applied. The BCH is transmitted in a second time slot of a first subframe 0 within the frame and is transmitted over the center 72 subcarriers. The PSS and the SSS which are the synchronization signals may be transmitted over the center 72 subcarriers within a first slot of the first subframe 0 and a sixth subframe 5 and the SSS may be transmitted at the transmission symbol adjacent to the transmission symbol for PSS is transmitted. That is, the SSS may be transmitted at a transmission symbol just before the transmission symbol of the PSS.

Further, the structure of LL TTI described with reference to FIG. 2 or FIG. 3 may be applied to the LL TTI with the length of at least one transmission symbol described with reference to FIG. 4.

As such, when the LL TTI with length of at least one transmission symbol is configured for the low latency service, the base station uses the PCFICH in the downlink of the existing LTE system to transmit the information related to LL TTI.

The existing PCFICH carries the control format indicator (CFI) information of 2 bits indicating the number of transmission symbols for the control channels such as the PDCCH and the PHICH within the subframe and is transmitted using the fixed transport format (for example, MCS) at the fixed resource position determined by the cell identifier. The CFI information of 2 bits transmitted through the PCFICH corresponds to the three control region sizes of 1, 2, 3 symbols and the fourth is reserved for future use. That is, CFI=1 means that the size of the control region is 1 symbol, CFI=2 means that the size of the control region is 2 symbols, CFI=3 means that the size of the control region is 3 symbols, and CFI=4 is reserved for future use.

According to the exemplary embodiment of the present invention, the base station may use the undesignated CFI value (for example, 4) as an indicator of the LL TTI as shown in Table 1. In this case, an n value which is the number of transmission symbols within the LL TTI and the configuration of the control region and the data region within LL TTI may be fixed or associated information may be separately transmitted to the terminal.

TABLE 1

| CFI | Description | LL TTI indicator |
|---|---|---|
| 1 | 1 symbol for control channel | LL TTI Indicator = 0 |
| 2 | 2 symbols for control channel | (normal TTI) |
| 3 | 3 symbols for control channel | |
| 4 | LL TTI indicator (n symbols for LL TTI) | LL TTI indicator = 1 |

Figure 5:
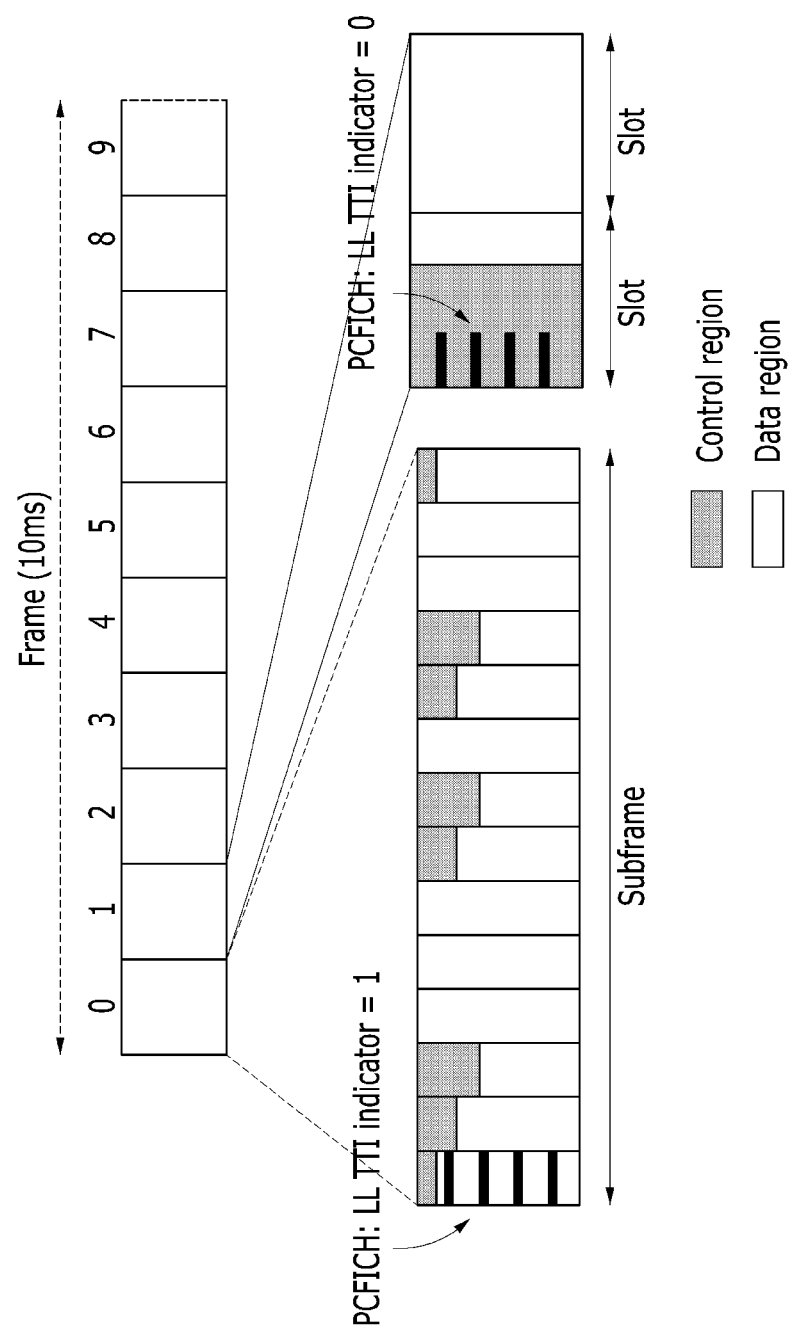
FIG. 5 is a diagram illustrating a variable TTI by a PCFICH shown in Table 1.

FIG. 5 is a diagram illustrating a variable TTI by using CFI transmitted through the PCFICH shown in Table 1.

Referring to FIG. 5, the CFI information "4" transmitted through the PCFICH in each subframe represents the LL TTI indicator "1" and indicates the LL TTI. Therefore, the corresponding subframe may be made up with LL TTIs as illustrated in FIG. 2 or FIG. 3.

The CFI information "1", "2", and "3" transmitted through the PCFICH in each subframe represent are analyzed as the LL TTI indicator "0" and indicate the normal TTI corresponding to one subframe.

As such, the base station may configure a frame which may support both of the terminals supporting the existing LTE system and the terminals supporting the low latency service with the LL TTI, using the existing PCFICH.

Further, the base station may also transmit the information related to the LL TTI and the configuration of the control region and the data region within the LL TTI through the CFI carried on the PCFICH, unlike the existing usage of the CFI in the LTE system. For example, the base station may redefine the CFI information to indicate the number of transmission symbols representing the length of the LL TTI and the configuration information of the control region and the data region within the LL TTI.

That is, the base station may extend 2 bits CFI information to N bits (for example, 2≤N≤8). M bits (for example, 2≤M≤6) among the N bits may be used to represent the number of transmission symbols within the LL TTI, and the rest L bits (for example, 0≤L≤6) of the N bits may be used to represent the configuration information of the control region and the data region within the LL TTI. The number of transmission symbols within the LL TTI using the M bits may represent a value from 1 to 14 in the case of the normal CP. The L bit indicates a ratio of the control region to the data region within the LL TTI and may represent values of a ratio (1/P*bandwidth) of the control region to the entire bandwidth of the system, a ratio (1/P*length of LL TTI) of the control region to the length of the LL TTI, etc. Here, P may be an integer larger than 1, for example, 2, 3, 4, or 5.

Figure 6:
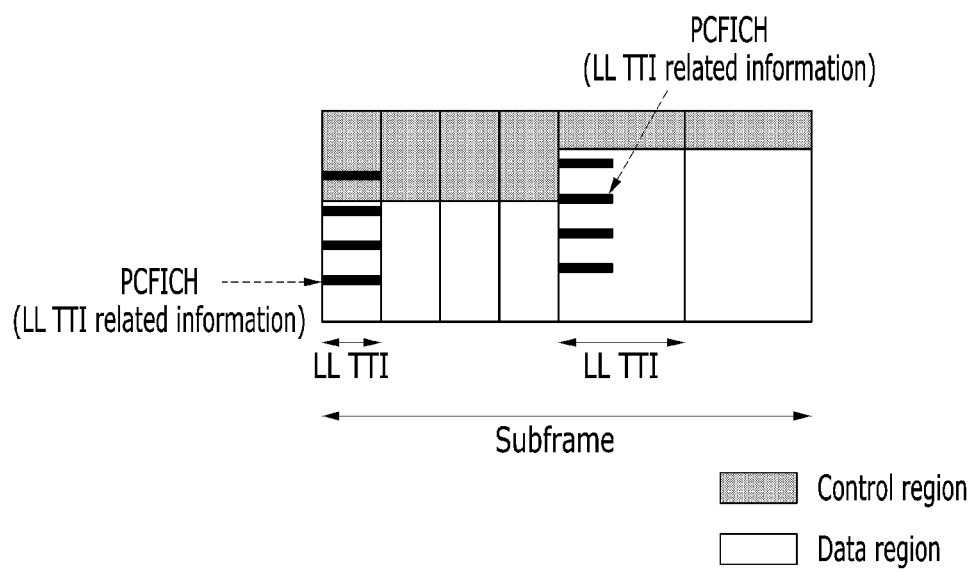
FIGS. 6 to 8 each are diagrams illustrating an example of a PCFICH transmission method according to an exemplary embodiment of the present invention.
Figure 7:
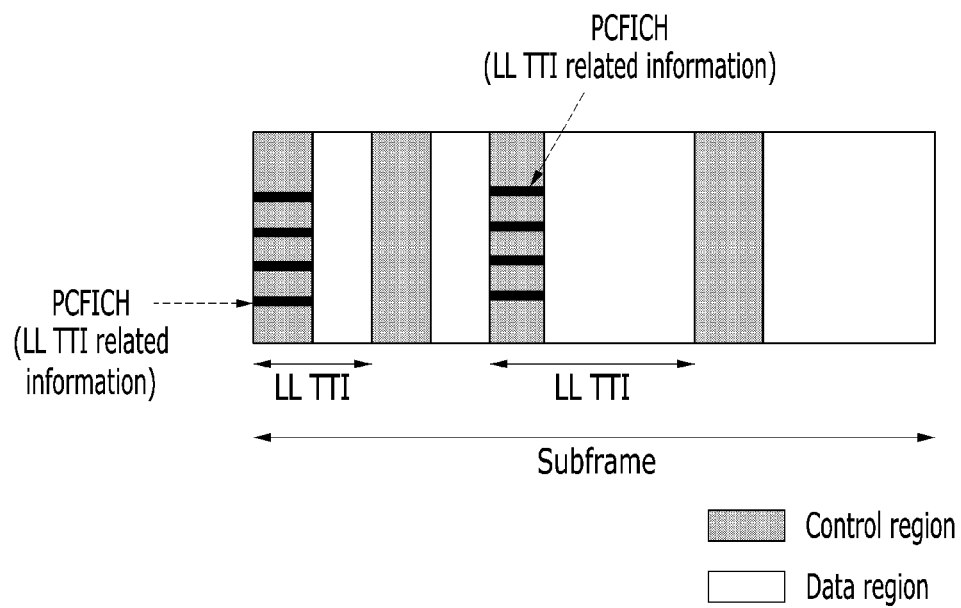
Figure 8:
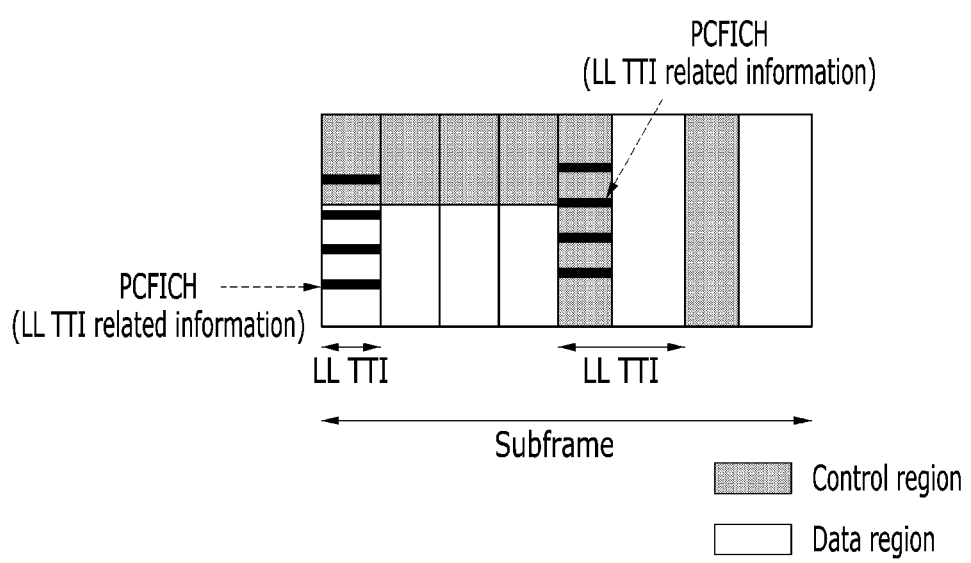

As such, when the CFI is redefined unlike the existing LTE system, the PCFICH may be transmitted multiple times per subframe in transmission symbol unit as illustrated in FIG. 6, FIG. 7 or FIG. 8, while the PCFICH is transmitted one time per suframe in the existing LTE system.

FIGS. 6 to 8 each are diagrams illustrating an example of a PCFICH transmission method according to an exemplary embodiment of the present invention.

Referring to FIGS. 6 to 8, the PCFICH may be positioned at a fixed specific region in the LL TTI. Therefore, unlike the terminal supporting the existing LTE system, the terminal supporting the LL TTI first may identify whether there is the PCFICH for LL TTI at the fixed position per each transmission symbol.

Further, the CFI information may further include information related to duration (or the number of LL TTIs) which the current CFI information is valid and the terminal may determine a position of next PCFICH through the current CFI information.

In particular, as illustrated in FIG. 8, when the LL TTI in which the control region and the data region are divided into the frequency domain and the LL TTI in which the control region and the data region are divided into the time domain exist in the one subframe, the configuration information of the control region and the data region within the LL TTI may further include a T/F indicator which is 1 bit information indicating the division scheme of the control region and the data region. The T/F indicator indicates whether the control region and the data region within the LL TTI are divided into the frequency domain or the time domain. For example, if the T/F indicator is 0, it may represent that the control region and the data region within the corresponding LL TTI are divided into the frequency domain. If the T/F indicator is 1, it may represent that the control region and the data region within the corresponding LL TTI are divided into the time domain. Further, the opposite case may also be possible.

Figure 9:
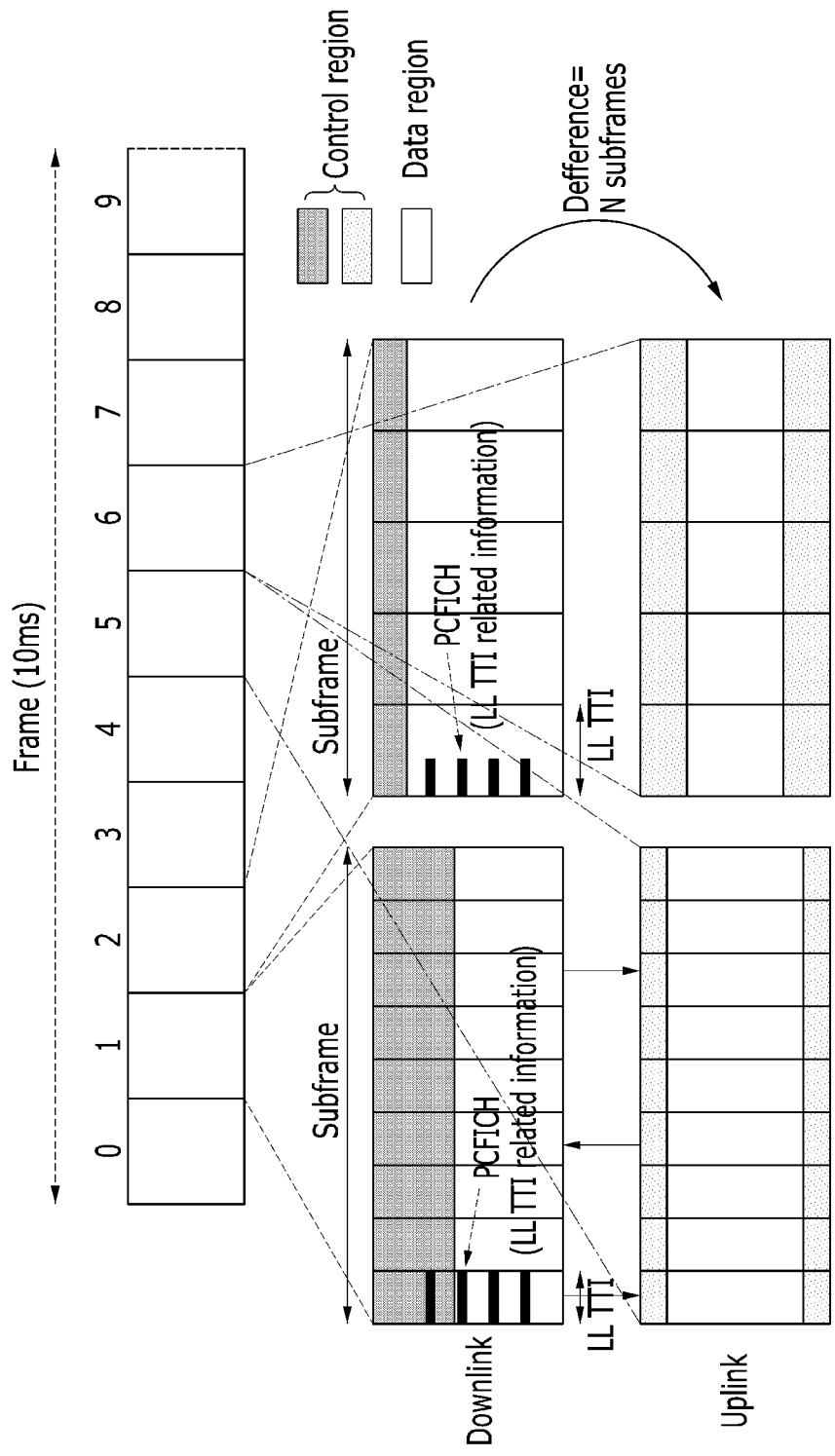
FIGS. 9 and 10 are diagrams illustrating a relationship between a downlink LL TTI and an uplink LL TTI when a frame is composed using the LL TTI according to the exemplary embodiment of the present invention.
Figure 10:
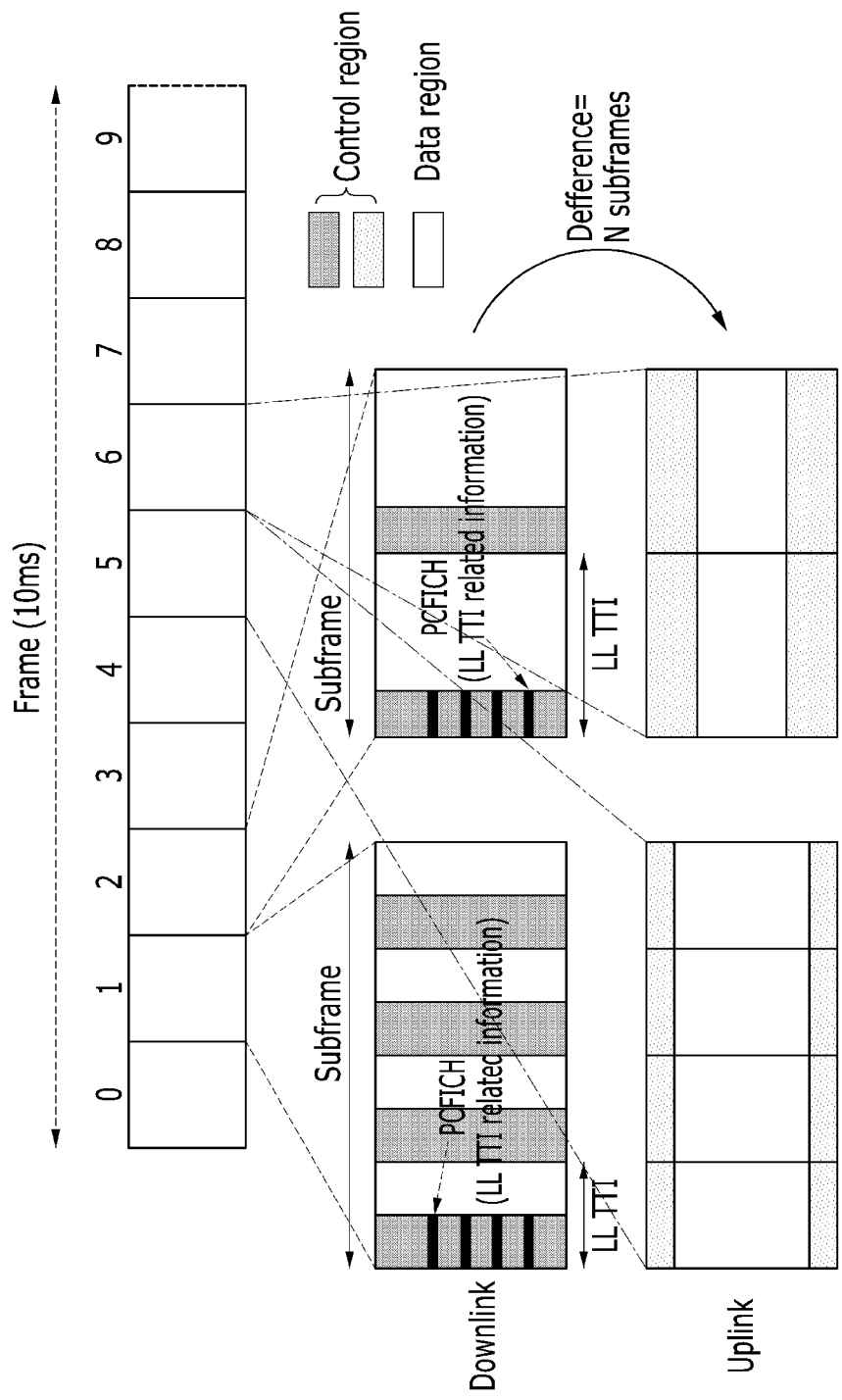

FIGS. 9 and 10 are diagrams illustrating a relationship between a downlink LL TTI and an uplink LL TTI when a frame is composed using the LL TTI according to the exemplary embodiment of the present invention.

Referring to FIGS. 9 and 10, the LL TTI may be varied on a per-subframe basis and the plurality of LL TTIs within the subframe may be identically set. The LL TTI in the specific downlink subframe may correspond to the LL TTI in the uplink subframe, having a difference of the N subframes. The LL TTI may be changed in the subframe unit. In this case, the value of N corresponding to the difference in units of subframe may include 0. The value of N may be set, after considering the feedback timing between the downlink and uplink.

In the uplink subframe, the location of the control region of the LL TTI may be assigned at the edges of bandwidth to provide frequency diversity if the uplink is based on the SC-FDMA scheme used in the existing LTE system.

In the uplink subframe, the location of the control region of the LL TTI may also be assigned at one edge of bandwidth, like in the downlink. If an OFDMA scheme is used in the uplink like in the downlink, division scheme in time domain may be applied to dividing the control regions and the data regions within each LL TTI even in the uplink subframe.

Figure 11:
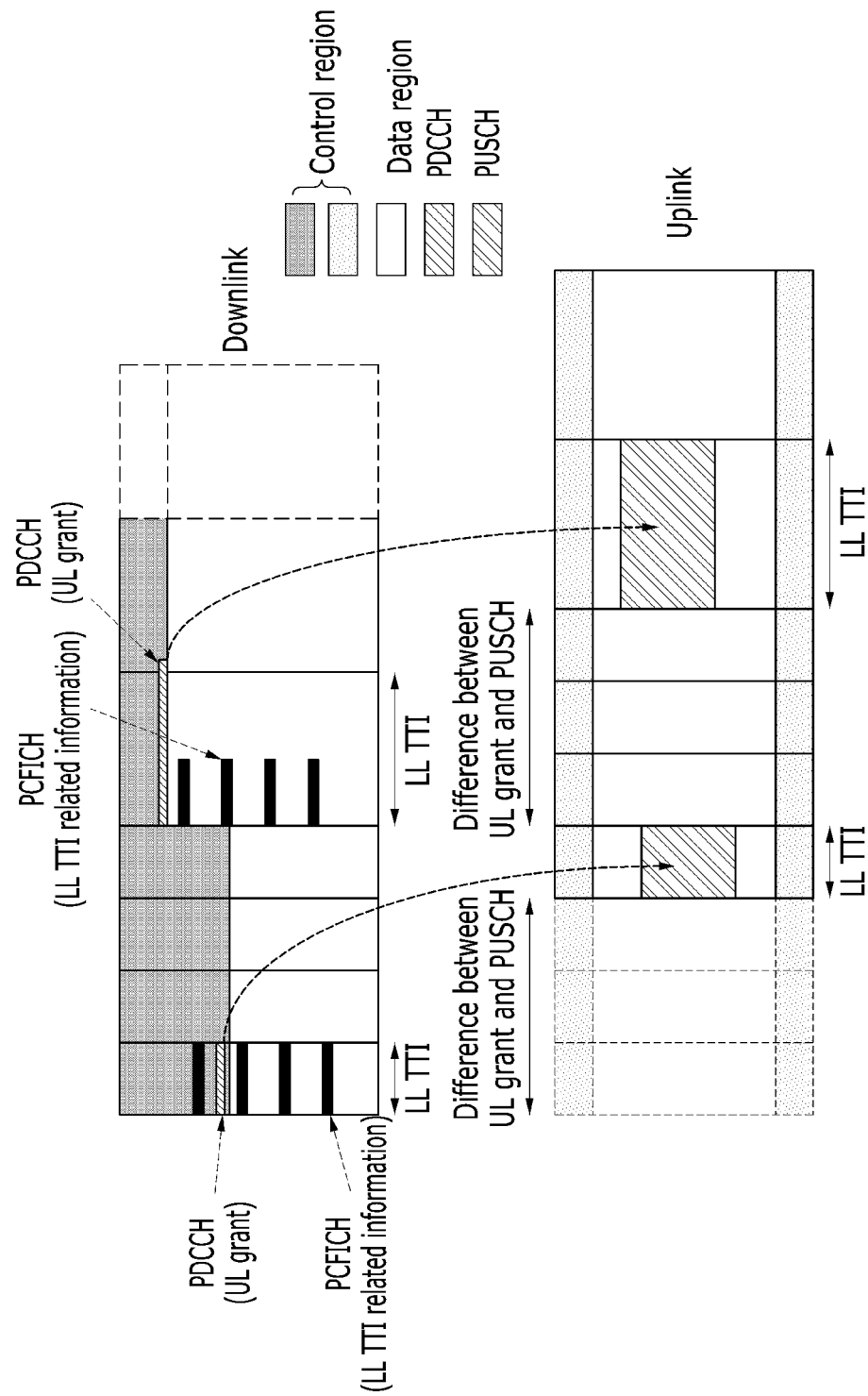
FIGS. 11 and 12 each are diagrams illustrating a relationship between the downlink LL TTI and the Uplink LL TTI when the LL TTI according to the exemplary embodiment of the present invention varies within a subframe.
Figure 12:
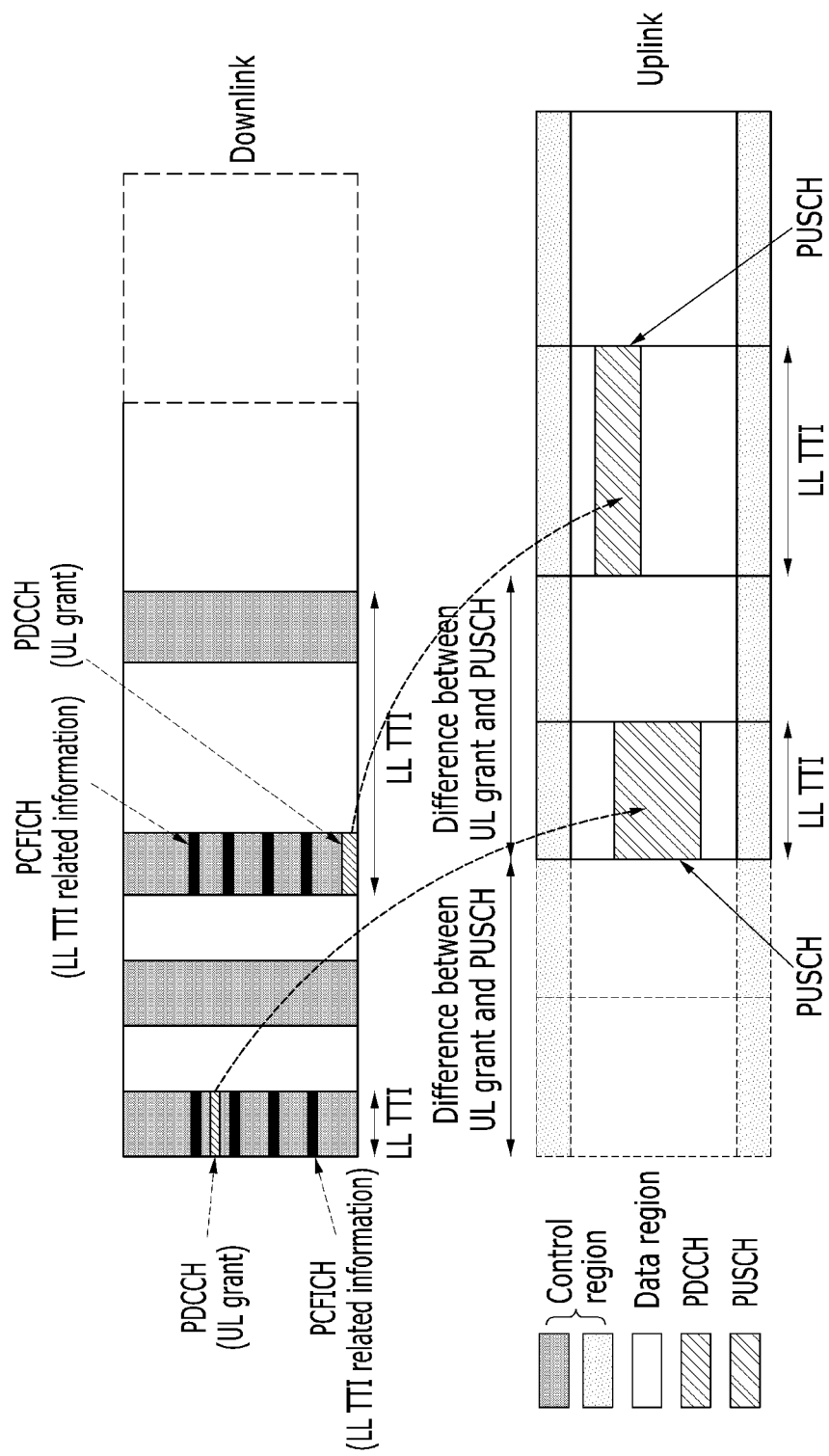

FIGS. 11 and 12 each are diagrams illustrating a relationship between the downlink LL TTI and the uplink LL TTI when the LL TTI according to the exemplary embodiment of the present invention varies within a subframe.

Referring to FIGS. 11 and 12, when the LL TTI varies within the subframe, the relationship between downlink LL TTI and the uplink LL TTI are determined by time difference between transmission of uplink resource allocation information (UL grant) through the PDCCH in the downlink control region and transmission of data using allocated uplink resource. That is, when the uplink data is transmitted through the PUSCH determined by the uplink resource allocation information (UL grant), the value (length) of uplink LL TTI is same as that of downlink LL TTI which the uplink resource allocation information (UL grant) is transmitted. In this case, according to the uplink multiple access scheme (i.e. the SC-FDMA or the OFDMA), the position of the control region in the uplink LL TTI may be determined as illustrated in FIGS. 8 and 9.

In addition to a method which changes CFI from 2 bits to any multiple bits, the base station may newly add an enhanced physical control format indicator channel (ePCFICH) without changing the number of bits for the CFI to support coexistence with the existing LTE system to transfer the information related to the LL TTI and the configuration of the control region. In this case, the base station may use the unused value (CFI=4) among the CFIs of the existing PCFICH as shown in Table 2 to indicate whether there is the ePCFICH within the corresponding subframe and to enable the terminals to receive the ePCFICH at the predetermined resource position.

TABLE 2

| CFI | Description |
| --- | --- |
| 1 | 1 symbol for control channel |
| 2 | 2 symbols for control channel |
| 3 | 3 symbols for control channel |
| 4 | ePCFICH indicator |

The ePCFICH separately transmitted from the PCFICH carries the enhanced CFI (eCFI) of N bits and the N bits consist of the M bits representing the length of the LL TTI and the L bits representing the configuration information of the control region and the data region. That is, the M bits are used to indicate the number of transmission symbols representing the length of the LL TTI and the L bits are used to indicate the confirmation information of the control region and the data region within the LL TTI. According to the information of the LL TTI represented by the M bits, the configuration information of the control region and the data region indicated by the L bit may represent the ratio of the bandwidth of the control region to the entire bandwidth or the number of the transmission symbol for the control region among the number of total transmission symbols within the LL TTI. Table 3 shows an example in which the L=2.

TABLE 3

| Configuration information of control region and data region | LL TTI length = 1 symbol | LL TTI length > 1 symbol |
| --- | --- | --- |
| 1 | 7% | 1 symbol for control channel |
| 2 | 14% | 2 symbols for control channel |
| 3 | 21% | 3 symbols for control channels |
| 4 | 28% | reserved |

As shown in the above Table 3, when the length of the LL TTI is 1 symbol, 2 bits (i.e. L bits) indicate the bandwidth information occupied by the control region in the entire bandwidth. When the length of the LL TTI is larger than 1 symbol, 2 bits (i.e. L bits) may indicate the number of transmission symbols for the control region among the number of total transmission symbols.

Figure 13:
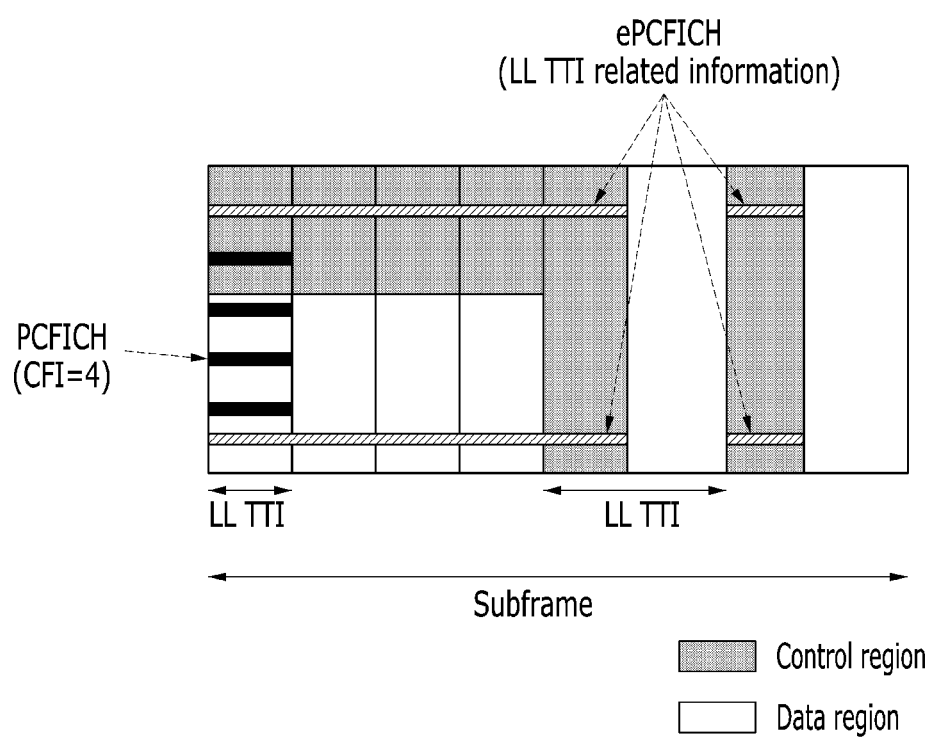
FIG. 13 is a diagram illustrating an example of a position of a resource transmitted by ePCFICH according to an exemplary embodiment of the present invention.

FIG. 13 is a diagram illustrating an example of a resource position for the ePCFICH transmission according to an exemplary embodiment of the present invention.

Referring to FIG. 13, the ePCFICH may exist when the value of CFI carried on the PCFICH is 4 and may be transmitted per-subframe. The ePCFICH may be positioned in the fixed specific region in the LL TTI and may be positioned in a plurality of regions spaced apart from each other in the frequency domain. Further, the ePCFICH may be continuously transmitted over the plurality of LL TTIs.

Figure 14:
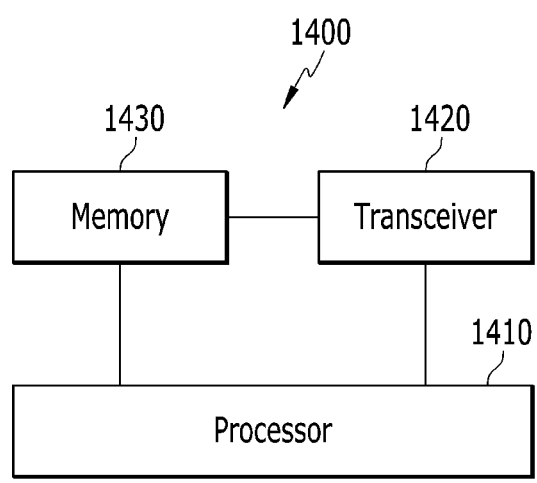
FIG. 14 is a diagram illustrating an apparatus for configuring a TTI according to an exemplary embodiment of the present invention.

FIG. 14 is a diagram illustrating an apparatus for configuring a TTI according to an exemplary embodiment of the present invention.

Referring to FIG. 14, an apparatus 1400 for configuring a transmission time interval includes a processor 1410, a transceiver 1420, and a memory 1430. The apparatus 1400 for configuring a transmission time interval may be implemented within the base station.

The processor 1410 configures the LL TTI corresponding to the length of at least one transmission symbol to support the low latency service and controls the operation of the transceiver 1420 depending on the LL TTI.

As described with reference to FIGS. 2 and 3, the processor 1410 may configure the control region and the data region in the LL TTI and may transfer the LL TTI related information through the transceiver 1420 using the PCFICH or the ePCFICH to the terminal.

The transceiver 1420 transmits the control information and data in the downlink LL TTI to the terminal. Further, the transceiver 820 may receive the control information and data that the terminal transmits in the uplink LL TTI.

The memory 1430 stores instructions which are performed by the processor 1410 or loads instructions from a storage (not illustrated) and temporarily stores the instructions and the processor 1410 executes the instructions which are stored or loaded in the memory 1430.

The processor 1410 and the memory 1430 are connected to each other through a bus (not illustrated) and an input/output interface (not illustrated) may be connected to the bus. In this case, the transceiver 1420 is connected to the input/output interface and peripheral devices such as an input device, a display, a speaker, and a storage may be connected to the input/output interface.

According to an exemplary embodiment of the present invention, it is possible to provide the frame structure based on the same parameter values (frame length, subframe length, symbol length, etc.) as the existing LTE system but having the shorter TTI. As a result, it is possible to support the low latency service of 1 ms or less and various transmission latency times and various services requiring the TTI in the mobile communication system.

The exemplary embodiments of the present invention are not implemented only by the apparatus and/or method as described above, but may be implemented by programs realizing the functions corresponding to the configuration of the exemplary embodiments of the present invention or a recording medium recorded with the programs, which may be readily implemented by a person having ordinary skill in the art to which the present invention pertains from the description of the foregoing exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for configuring a transmission time interval (TTI) in a base station of a mobile communication system, comprising:
   configuring at least one LL (low latency) TTI, with a length of at least one transmission symbol and shorter than a length of one subframe, in a subframe including a plurality of transmission symbols;
   transmitting LL (low latency) TTI related information using a control format indicator (CFI) of N bits larger than 2 bits of a physical control format indicator channel (PCFICH) transmitted at a defined transmission symbol position within the subframe;
   wherein the CFI includes:
      first CFI values of M bits among the N bits representing a number of transmission symbols within the LL TTI, and
      second CFI values of L bits among the N bits representing configuration information of a control region and a data region within the LL TTI.

2. The method of claim 1, wherein:
   the configuring at least one LL TTI includes configuring a control region and a data region within the LL TTI which are changed in units of LL TTI.

3. The method of claim 2, wherein:
   the configuring at least one LL TTI further includes dividing the control region and the data region in the at least one LL TTI into a frequency domain or a time domain.

4. An apparatus for configuring a transmission time interval in a mobile communication system, comprising:
   a processor configuring at least one low latency transmission time interval (TTI), with a length of at least one transmission symbol and shorter than a length of one subframe, in a subframe including a plurality of transmission symbols; and
   a transceiver transmitting LL (low latency) TTI related information using a control format indicator (CFI) of N bits larger than 2 bits of a physical control format indicator channel (PCFICH) transmitted at a defined transmission symbol position within the subframe;
   wherein the CFI includes:
      first CFI values of M bits among the N bits representing number of transmission symbols within the LL TTI, and
      second CFI values of L bits among the N bits representing configuration information of a control region and a data region within the LL TTI
   the PCFICH at a predefined transmission symbol position within the subframe.

5. The apparatus of claim 4, wherein:
   the processor indicates duration in which the CFI is applied using other some of the remaining unused bits of the N bits.

6. The apparatus of claim 4, wherein:
   the processor indicates a division scheme of the control region and the data region using other some of the remaining unused bits of the N bits, and
   the division scheme includes a division scheme in a frequency domain and a division scheme in a time domain.

7. The apparatus of claim 4, wherein:
   the processor changes configuration of a control region and a data region within LL TTI in at least one LL TTI unit.

8. The apparatus of claim 4, wherein:
   the processor identically configures a control region and a data region within the LL TTI during the at least one LL TTI, and
   the number of LL TTIs within the subframe and the configurations of the control region and the data region within the LL TTI are changed for each subframe.

* * * * *